United States Patent [19]
Gröllmann

[11] Patent Number: 5,268,740
[45] Date of Patent: Dec. 7, 1993

[54] FIBER OPTIC SAGNAC INTERFEROMETER WITH CARRIER FREQUENCY REDUCED OUTPUT FOR MEASURING A RATE OF ROTATION

[75] Inventor: Peter Gröllmann, Freiburg, Fed. Rep. of Germany

[73] Assignee: Litef GmbH, Freiburg im Breisgau, Fed. Rep. of Germany

[21] Appl. No.: 781,703

[22] Filed: Oct. 22, 1991

[30] Foreign Application Priority Data

Oct. 31, 1990 [DE] Fed. Rep. of Germany ....... 4034664

[51] Int. Cl.[5] ............................................. G01C 19/72
[52] U.S. Cl. .................................................... 356/350
[58] Field of Search ........................................ 356/350

[56] References Cited

U.S. PATENT DOCUMENTS 4,705,399 11/1987 Graindorge et al. ............... 356/350

FOREIGN PATENT DOCUMENTS

| 0283105 | 9/1988 | European Pat. Off. |
|---|---|---|
| 294915 | 12/1988 | European Pat. Off. ............. 356/350 |
| 400197 | 12/1990 | European Pat. Off. ............. 356/350 |
| 3140110 | 4/1983 | Fed. Rep. of Germany . |
| 3204810 | 8/1983 | Fed. Rep. of Germany . |

Primary Examiner—Samuel A. Turner
Attorney, Agent, or Firm—Elliott N. Kramsky

[57] ABSTRACT

A fiber optic Sagnac interferometer for measuring rotation rate includes a light source that is ON/OFF keyed in a predetermined cycle. After filtering of the readout signal in the course of demodulation, a substantially-lower readout signal carrier frequency, and, thus, corresponding-lower demodulator requirements, may be achieved. A closed loop configuration is disclosed, associated with a scale factor controlling circuit, for rotation rate sensors with keyed light sources. The invention is particularly suitable for fiber optical rotation rate sensors with short sensor coils.

4 Claims, 8 Drawing Sheets

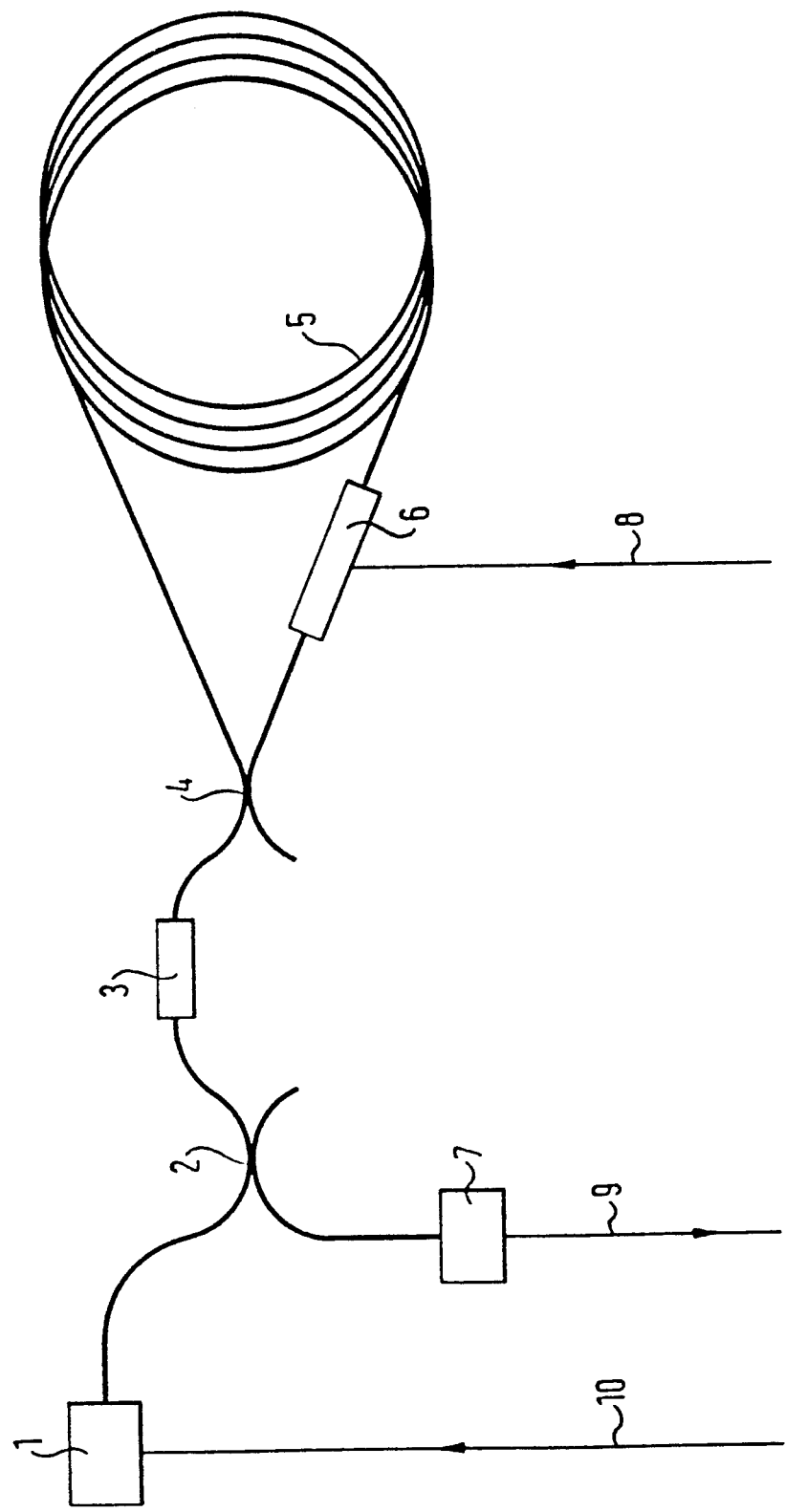

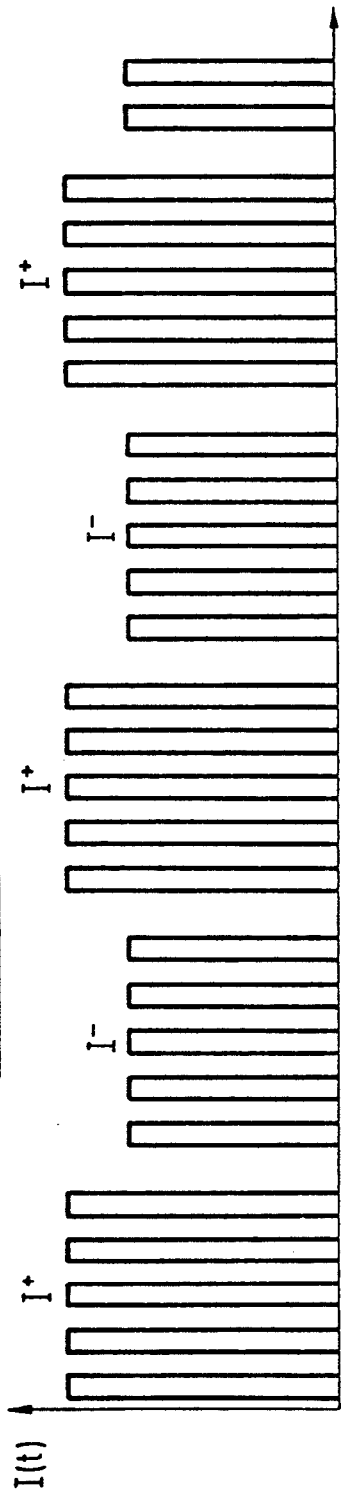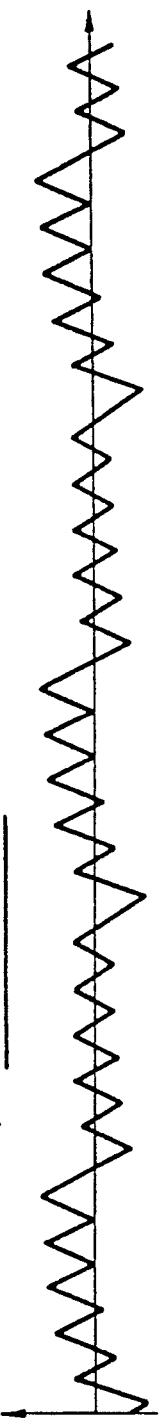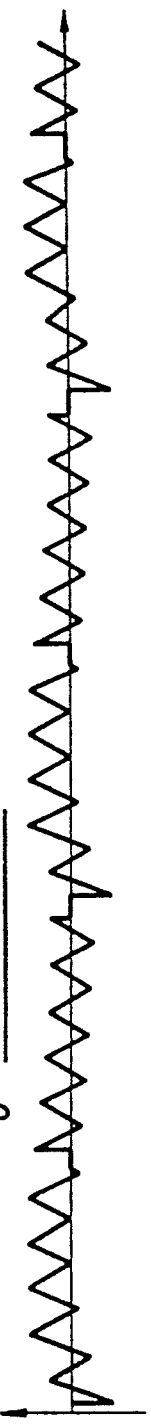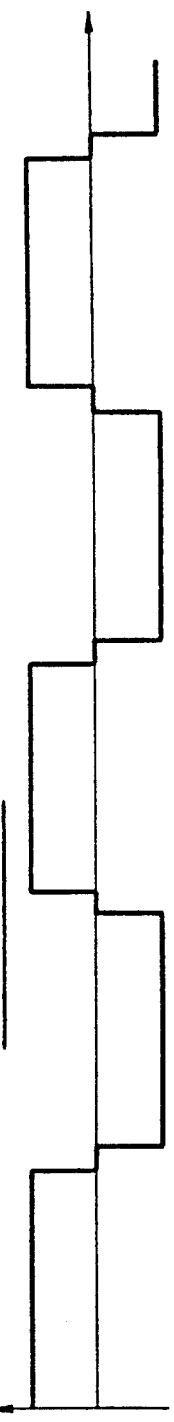
FIG. 2e PRIOR ART
FIG. 2f PRIOR ART
FIG. 2g PRIOR ART
FIG. 2h PRIOR ART

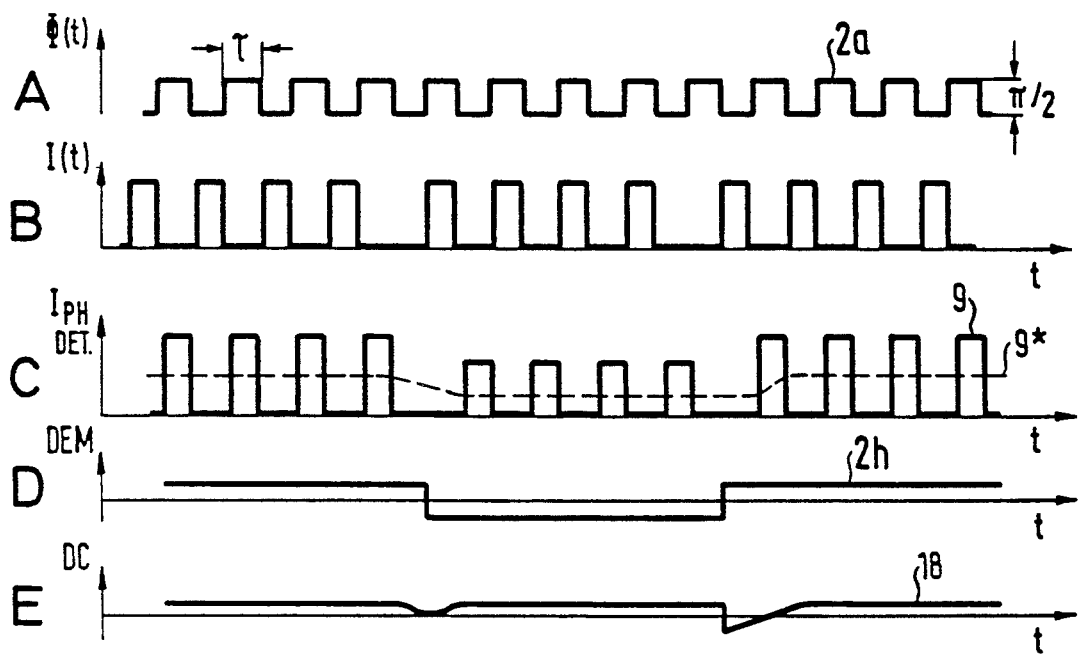
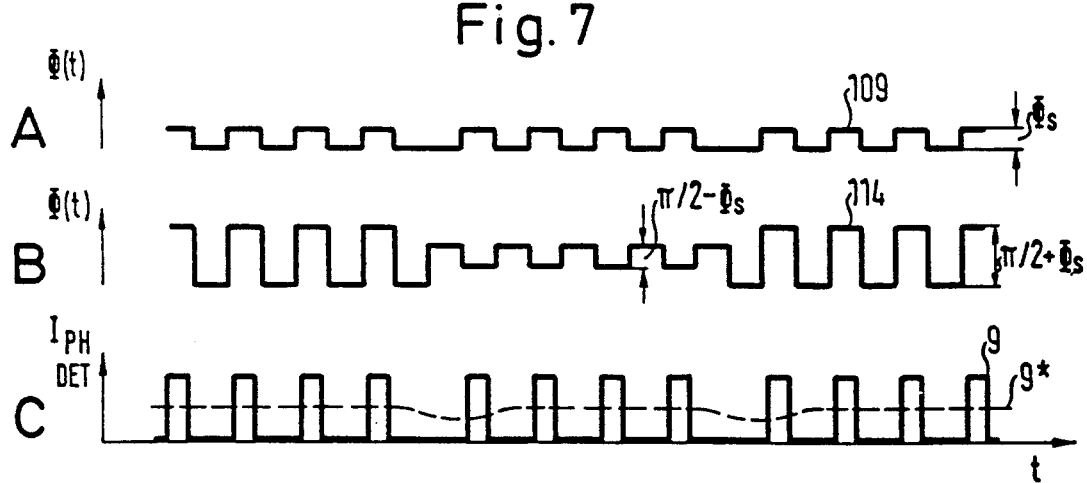

FIBER OPTIC SAGNAC INTERFEROMETER WITH CARRIER FREQUENCY REDUCED OUTPUT FOR MEASURING A RATE OF ROTATION

BACKGROUND

1. Field of the Invention

The present invention relates to a new fiber optic Sagnac interferometer for measuring rotation rates.

2. Description of the Prior Art

Fiber optic Sagnac interferometers, also known as fiber optic gyros (FOGs), are recognized devices for sensing rotational movements of a body, such as a projectile in inertial space. Such devices are found in various configurations and employ differing signal evaluation principles. A fiber optic gyro usually comprises an annular light path formed by means of optical wave guides, an optical phase modulator at one end of the path, optical couplers for coupling light into the light path from a light source and coupling out modulated light (such light carrying rate of rotation information) to a photodetector, and an electronic circuit arrangement for evaluating the detector signals and imposing a specified modulation upon the phase modulator.

Fiber optic gyro of principal interest to the present invention make use of a periodic phase shift at the modulator, such period corresponding to twice the light transit time in the annular light path, and an unmodulated light source of constant light power. When rotational movement of the annular light path (i.e., the ring) occurs, the photodetector is acted upon by a modulated light intensity that includes a component having the frequency of the modulation signal. The amplitude of this signal is a measure of the magnitude of the rate of rotation, while the phase relationship relative to the modulation phase provides information on the direction of rotation. By employing suitable carrier frequency modulation processes (e.g. synchronous demodulation with the modulation frequency as reference), it is possible to obtain a signal that is single-valued with respect to the direction of rotation and has a nonlinear amplitude-to-rotation rate relationship.

The so-called "readout" signal can either be directly evaluated as a signal carrying rotation rate information (open loop process) or may serve to supply the phase modulator with additional signals, via a control device, to compensate the effect of the rotation-generated phase shift (Sagnac phase) with an additional optical phase shift. This additional phase shift is likewise a direct measure of the rotation rate (closed loop process). The latter process requires greater technical expenditure with respect to signal processing devices, delivering better results. This is especially significant at the rate of rotation measurement accuracies required over the wide dynamic range required in inertial technology.

So-called resetting (closed loop) Sagnac interferometers are described in U.S. patent Ser. No. 4,705,399 as well as European patent publication EP-A-0,294,915. According to the teaching of the above-mentioned United States patent, phase resetting at the phase modulator is achieved by means of a rectangular modulated stepped phase shift with reverse jumps of $2\pi$ phase variation. The sawtooth pitch is a measure of the rotation rate. European patent application No. 90/100,103.2 discloses a substantially improved process in which a reduced rotation rate insensitivity range is achieved at low rates of rotation and scale factor drift is prevented in such a sensor arrangement.

In the process described in Ep-A-0,294,915, the photodetector signals are only evaluated at specified periods. Outside such periods the signals are separated by an electronic switch from the downstream signal processing device. A rate of rotation signal is obtained by means of a demodulator which controls the amplitude and phase relationship of phase modulation signals that are fed to the phase modulator in addition to the other modulation signals. Following amplitude, phase relationship, magnitude and sign, the additional modulation signals contain the reset-effective optical phase shift and are therefore also a direct measure of the rotation rate. Compared to the so-called phase ramp reset process described in the above-mentioned U.S. patent, is reset signal need not rise as a ramp due to the periodic readout of the photodetector via the above-mentioned switch since a more simply generated rectangular oscillation is sufficient.

A major technical problem of rotation rate sensors of the above-mentioned type has been sufficiently precise demodulation of the readout signal. On the one hand, the demodulators must possess a very large dynamic range (frequently greater than six decades), especially for open loop arrangements. On the other hand, they must be designed for frequencies of a few 100 kHz. As a rule, fast synchronous demodulators, constructed from FET switches, are used. However, error terms can occur due to charge carrier injection during the switch-over processes, offset errors caused by the introduction of interspersed harmonics of the gyro modulation signal into the input of the demodulator, phase differences between the modulation signal and the reference signal of the demodulator and so-called loss modulation. Moreover, both fast and high-resolution A/D converters are required which are not yet current available.

In order to deal with these problems of gyro readout signal demodulation, European patent application No. 89/110,041.4, the content of which is hereby incorporated by reference, discloses a demodulation process that makes use of the fact that the large gyro bandwidth required for other reasons is not at all required for the gyro readout signal or rate of rotation signal. By suitable modulation of the generally very broadband light source (i.e., by pulse-controlled energization and deenergization of the light source), it is possible to transform the readout signal to a substantially lower frequency range. Although the phase modulator in the ring is, as previously, modulated with a modulation signal whose period is twice the light transit time in the ring, signals carrying rate of rotation information again occur at the photodetector. The carrier frequency of such signals is, however, considerably lower than the phase modulator frequency compared with those processes of the above-mentioned prior art. This is especially true for fiber optic gyros of more recent construction having shorter fiber lengths and, correspondingly, a high modulation frequency. The readout signal frequency reduction achieved for such devices is of decisive importance.

SUMMARY AND OBJECTS OF THE INVENTION

It is, therefore, an object of this invention to provide a further improvement in a fiber optic gyro of the type described in European patent application 110,041.4.

It is a further object of the invention to provide an improvement in a fiber optic gyro of the type in which the carrier frequency of the readout signal is reduced by a suitable modulation or keying of the light source.

The present invention achieves the above and other objects by providing an improvement in a fiber optic Sagnac interferometer for measuring rotation rate. In such an interferometer, a light beam that emanates from a light source and is conducted via a fiber section passes through a first directional coupler to an output to which a photodetector for generating a readout signal is connected and is split in a second directional coupler into two partial light beams that are irradiated in opposite directions into a fiber coil. The beams are periodically modulated by a phase modulator that is controlled by a signal whose period corresponds to even-numbered multiples of the transit time ($\tau$) of the light through the coil. In such an interferometer, a switching signal generator periodically scans the exciter signal of the light source so that, during a first time interval corresponding to an integral multiple of the period of the phase modulation signal, only a specified first phase portion of the periodic interferometer output signal appears for further processing by a demodulation and evaluation circuit. A logic circuit triggers the switching signal generator so that, after the first time interval, during a second time interval or during successive time intervals corresponding in each case to an integral multiple of the period of the phase modulation signal, only a second or, in succession in each case, only a further phase portion of the periodic interferometer readout signal occurs so that, after a plurality corresponding to the number of individual recorded phase portions, of keying sequence changes, a whole period, composed of the sequence of the recorded phase portions of the readout signal, is recorded and subsequently, and in a similar manner and on a progressive basis, further periods, the duration of each of which corresponds to the number of keying pulses per phase portion, is substantially longer than the period of time the phase modulation signal and in which the readout signals of the phase portions recorded by the keying process are demodulated synchronously with the scanning time intervals.

In the improvement of such an interferometer provided by the invention, the phase modulator is driven by a modulation signal generator. The modulation signal generator comprises a resetting controlling device arranged to receive the demodulated readout signals and is acted upon by the output signal of the controlling device. It is arranged to deliver a rectangular signal synchronized with the frequency of the periodic modulation and has a rectangular phase relationship that alternates in the cycle of the trigger signal of the logic circuit by 180°, the amplitude of such rectangular signal following the output signal of the controlling device.

A summation device is arranged to accept the output of the signal generator at a first input and the modulation signal at a second input. The amplified sum output by the summation device acts upon the phase modulator as a modulation signal compensated with respect to rotation rate.

In more specific aspects, advantageous use is made of a proportional-integral controller in the controlling device. The controller set so that the amplitude control variable for the signal generator is a direct measure of rotation rate. It is also possible to read out rotation rate directly through an interface.

Scale factor correction may also be provided by employing a supplementary circuit, an illustrative embodiment of which will be provided.

The foregoing features and advantages of the invention will be further appreciated from the detailed description that follows. Such description is accompanied by a set of illustrative drawing figures. Numerals of the drawing figures, corresponding to those of the written description, point to the features of the invention, like numerals referring to like features throughout both the written description and the drawing figures.

BRIEF DESCRIPTION OF THE DRAWINGS

The invention is described with reference to European patent application 89/110,041.4 with a pulsed light source. Further defining the drawings, FIG. 1 is a schematic diagram of a Sagnac interferometer;

FIGS. 2a through 2h are a set of waveforms for illustrating the demodulation process according to European patent application 89/110,041.4 at various points of the fiber optic gyro of FIG. 1 and of an exciter and demodulator circuit in accordance with FIG. 3;

FIGS. 6A through 6E are a series of waveforms corresponding to those of FIGS. 2a through 2h in the presence of a rotation rate and incomplete Sagnac phase compensation;

FIGS. 7A through 7C are a set of waveforms for illustrating the operation of the alternative embodiment of the invention as shown in the broken-line circuit blocks of FIG. 5.

DETAILED DESCRIPTION

Figure 2A:
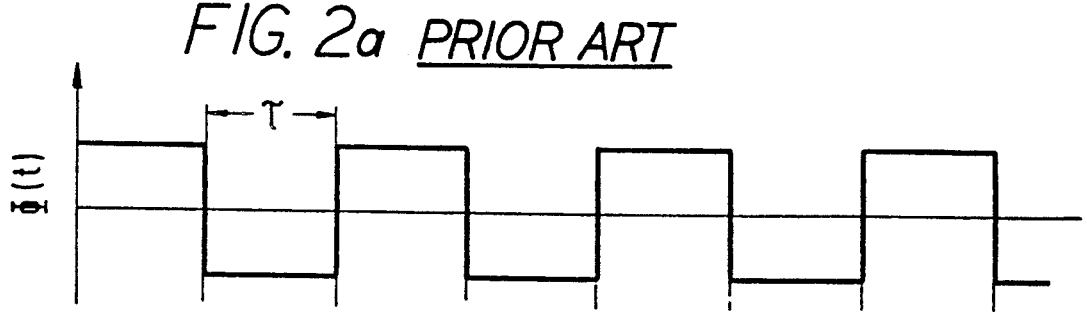

An explanation will first be given of the demodulation process of European patent application 89/110,041.4 (with reference to the interferometer of FIG. 1 in conjunction with FIGS. 2a through 2h, 3 and 4) to facilitate understanding of the invention.

Light from a light source 1 traverses a first directional coupler 2 and a polarizer 3 and is then split, in a second directional coupler 4, into partial light beams that pass, in opposite directions, through a fiber coil 5. The partial light beams are subjected to phase modulation at a phase modulator 6 that is preferably fitted to one end of the fiber coil. The phase modulator 6 is controlled by a drive signal 8 to produce generally time-dependent phase modulation. As a result of the modulation and the Sagnac phase $\Phi_s$, due to an inertial rotation rate $\Omega$, a readout signal I(t) is generated on a readout channel 9 at a photodetector 7 connected to the directional coupler 2. The current i(t) to operate the light source 1 is supplied through a conductor 10.

To a good approximation, the following represents the transfer function of the interferometer gyro:

$$I(t) = I_0(1 + \cos(\Phi_s + \Phi(t) - \Phi(t-\tau))) \qquad (1)$$

with the Sagnac phase $$\Phi_s = \frac{4\pi \cdot L \cdot R}{\lambda \cdot c} \cdot \Omega \qquad (2)$$

where $I_0$ designates a constant light intensity (constant luminous intensity through constant current level $i_0$ of the light source), $\tau$ designates the transit time of the light through the fiber coil 5, L designates the length of the fiber coil 5, R designates the mean radius of the fiber coil 5, $\lambda$ designates the mean wavelength of the light of the light source 1 and c designates the velocity of light in a vacuum.

In general, either a laser diode or a super-luminescence diode (SLD) is employed as the light source 1 of an interferometer gyro. Each has a very large bandwidth (greater than 1 Hz). Application circuits are known for diode drive bandwidths of several 100 MHz. Accordingly, the keying in and out of the light source 1 can take place extremely quickly via the current line or conductor 10.

Figure 2B:
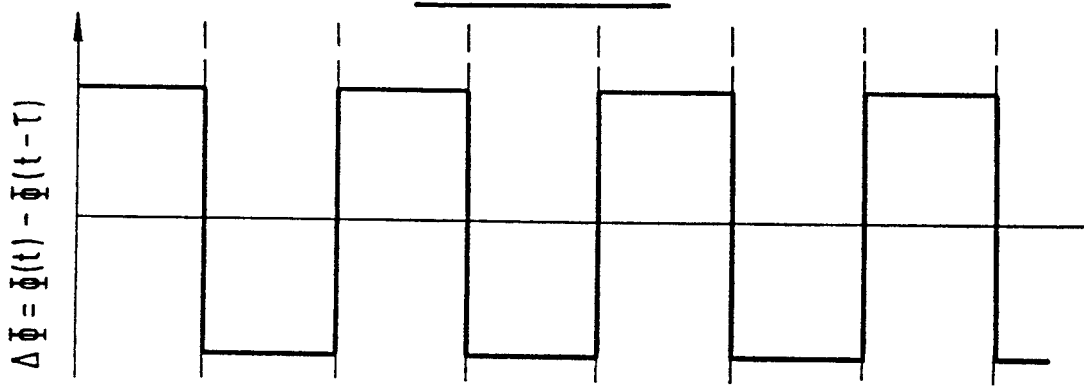
Figure 2C:
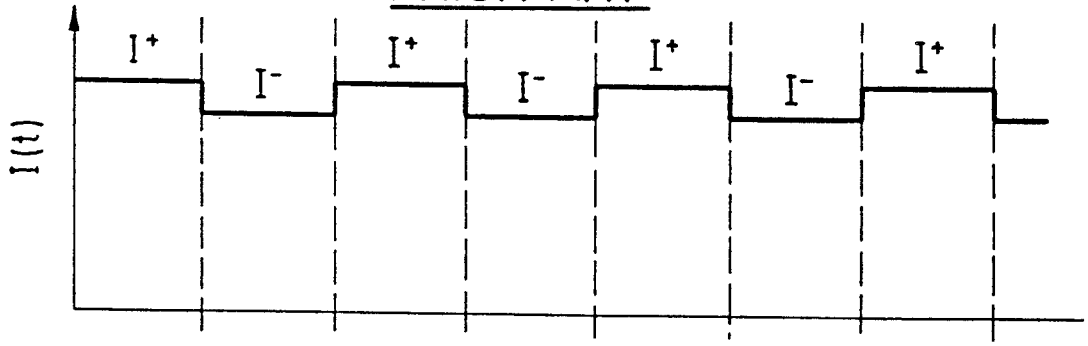

FIGS. 2a through 2h are a set of waveforms for illustrating the demodulation process according to European patent application 89/110,041.4 at various points of the fiber optic gyro of FIG. 1 and of an exciter and demodulation circuit in accordance with FIG. 3 (discussed below). FIG. 2a shows the drive signal of the phase modulator 6 for the case of a rectangular signal drive at approximately the optimal frequency (i.e., a frequency at which the transit time of the light through the fiber coil 5 corresponds to one-half of the period of the modulation frequency) of $f=1/(2*\tau)$. FIG. 2b shows the phase difference $\Delta\phi$ in the gyro that arises as a result of such modulation. FIG. 2c illustrates the time progression of the readout signal I(t) of the photodetector 7 (photodiode) in the presence of a rotation rate. In the case of synchronous demodulation, two successive signals I+ and I− are compared with one another at each instant and the difference is interpreted as the phase difference. In this case, the light source is driven alternately by a keyed signal i(t) for a specified time interval that corresponds to a multiple of the period of the modulation signal. The signal i(t) has a duration of, for example, 100 μs to 1 ms so that only the signal I+ appears and then only the signal I− appears for the same duration of time.

Figure 2D:
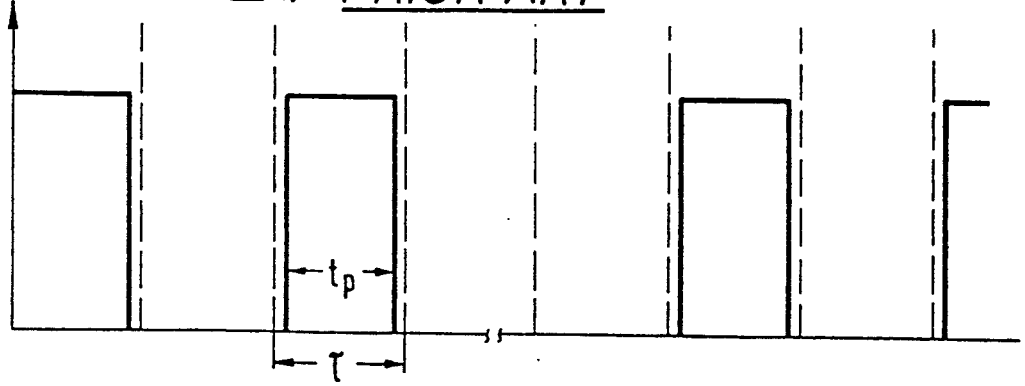

The signal sequence required for such a drive in the current supply line 10 of the light source 1 is shown in FIG. 2d. This signal sequence is generated by a generator 16 (FIG. 3) that is triggered by a logic circuit 15. The sequence of the readout signal of the photodetector 7 on the line or conductor 9 is shown in FIG. 2e. Such signal first passes to a low pass filter 11 and is d.c. filtered by a capacitor coupling 12 and passed to a synchronous demodulator 13 that is synchronized with respect to the slow alternation frequency of the phase relationship between the pulses of the keying in and out of the light source 1. The signal "downstream" of the capacitor coupling 12 is shown in FIG. 2f and the reference signal of the synchronous demodulator 13 in FIG. 2h to provide a better understanding.

A rectangular signal generator 17 drives the phase modulator 6 (FIG. 1) through a conductor 8 with a modulation signal in accordance with FIG. 2a. The output signal from the synchronous demodulator 13 represents the product of the signals of FIGS. 2f and 2h and is shown in the signal sequence of FIG. 2g. Such signal is conducted through a low pass filter 14 and is available, as signal 18 proportional to the rotation rate, at the output of the synchronous demodulator 13.

The present relatively slow (low-frequency) demodulation can be accomplished with a relatively economical demodulator component that operates at the possible low frequencies with very great null point stability and linearly.

To obtain no asymmetries in the demodulation process, it is necessary that only the phase relationship and not signal form or magnitude (luminous intensity of the light source 1, light amplitude) be altered in the course of the phase change of the light source keying in and out. This requirement is readily accomplished by known stabilization measures.

Figure 3:
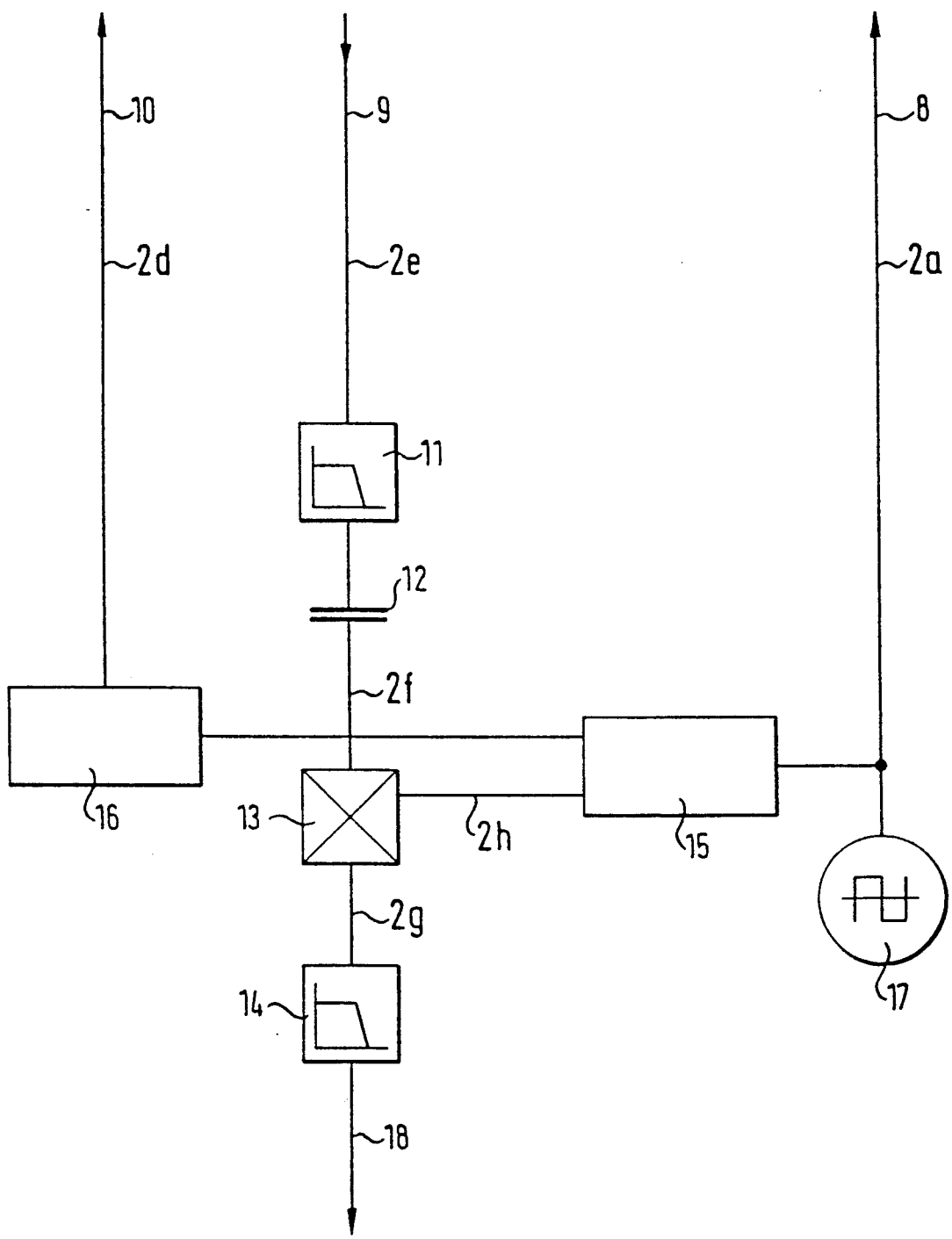
FIG. 3 is a block diagram of a demodulator circuit in accordance with the teachings of European patent application 89/110,041.4 that incorporates a pulse exciter circuit for the light source in the fiber optic gyro of FIG. 1.

The generator 16 for generating energization and deenergization pulses for the light source operates entirely independent of the remaining electronic system; an appropriate trigger signal is tapped off from the logic circuit 15, as indicated in the circuit of FIG. 3, only for purposes of synchronization.

Figure 4:
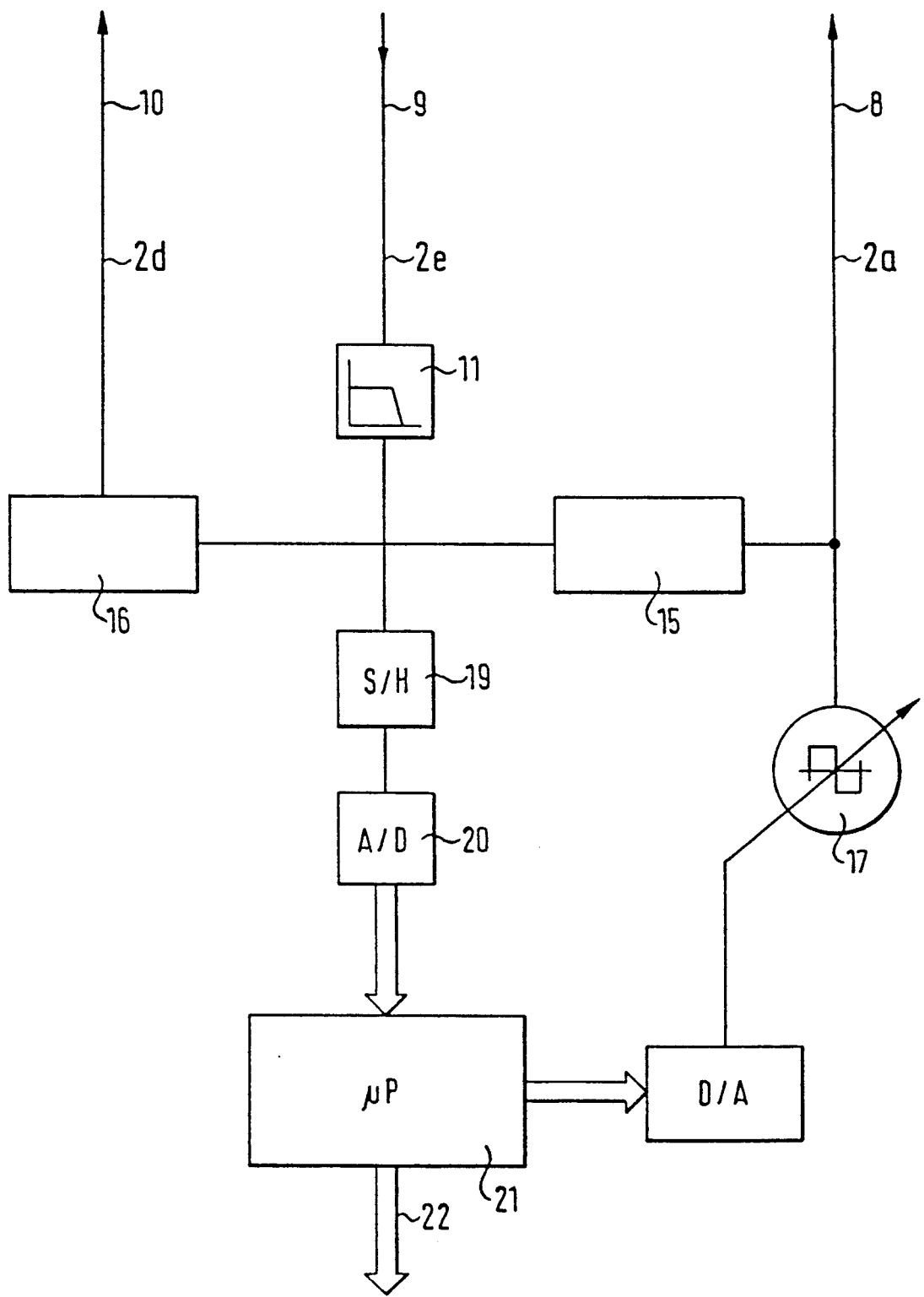
FIG. 4 is a block diagram of an alternative, digital embodiment of the circuit of FIG. 3.

Due to the relatively low demodulation frequency, digital demodulation processes are also quite suitable. FIG. 4 shows a demodulation circuit that can also be operated by the signal sequence of FIGS. 2a through 2f.

The difference between the circuit of FIG. 4 and that of FIG. 3 lies in that the signal that is low pass-filtered is passed via a sample and hold element 19 to an analog-to-digital converter 20 and processed by means of a signal processor 21. The signal processor 21 functions, in principle, as the synchronous or rectangular demodulator 13; it may, however, also digitally filter other signals and take over the function of the logic circuit 15, the phase modulator 17 and the generator 16 of the light source drive. For completeness, it should be mentioned that the function of the signal processor 21 can also be performed by hard-wired logic components. For example, a direction-controllable counter (up/down counter) controlled by an A/D converter 20 with only 1 bit resolution (comparator) and the logic circuit 15 can perform the demodulation process as well as an accumulation or integration process. The signal processor 21 delivers a digital output signal 22.

According to the invention, the signal 18 (FIG. 3) or 22 (FIG. 4) proportional to rotation rate is applied (referring to FIG. 5, a block diagram of a fiber optic Sagnac interferometer that incorporates a demodulator in accordance with FIG. 3 or FIG. 4) the input 101 of a controller 102 which performs, for example, as a PI (proportional integral) controller. The controller parameters determine the dynamic behavior of the rate of rotation reset in the case of a closed control loop. The output signal 103 from the controller 102 controls a signal generator 104 at the latter's input 105. Further signal inputs 106 and 107 of the signal generator 104 are acted upon by the signals according to FIGS. 2a and 2h, respectively, from the logic circuit 15. The output 108 of the signal generator 104 delivers substantially rectangular oscillation 109 of frequency equal to the signal of FIG. 2a and amplitude equal to the signal 103 (controller output) and keyed over periodically in phase relationship by 180° depending upon the condition of the signal of FIG. 2h. Thus the signal is in phase or antiphase relative to the rectangular signal of FIG. 2h. The signal 109 is passed to the input 110 of a summation device 111, which is acted upon, at a second input 112, by the modulation signal of FIG. 2a. A signal 114, at the output 113 of the summation device 111, is substantially proportional to the sum of the signals 109 according to FIG. 2a. Such signal 114 passes through an amplifier 115 to the phase modulator 6 to cause an optical phase shift that consists of a modulation component in accordance with the signal of FIG. 2a, and, in accordance with the invention, a resetting component originating with the signal 109. The last-mentioned signal component 109 is controlled, via the controlling device 102, so that the optical effect of the Sagnac phase shift, dependent upon the rate of rotation, is compensated and the demodulator output signal 18 (FIG. 2g), which passes to the input 101 of the controlling device 102, becomes substantially zero. Since the amplitude of the reset signal 109 is then a direct measure of the Sagnac phase shift, and, thus, of the rotation rate to be measured, the amplitude control variable 103 for the signal generator 104 is also a direct measure of rotation rate. Preferably, a linear interrelationship is obtained between the amplitude control variable 103 and the output amplitude of the signal 109 in the signal generator 104. In that case, the signal 103 is a linear measure of rotation rate and thus also represents sensor output and can be passed directly (or possibly via an interface 116) as a signal 103a representing the rate of rotation.

The functions of the controlling device 102, the signal generator 104, the summation device 111 and the interface 116 can be provided wholly or partly in analog or digital circuit technology with A/D or D/A converters provided at points of transition. Digital functional units can be provided wholly or partly in the signal processor 21 of FIG. 4. For example, the functions of the controlling device 102, the signal generator 104, the summation device 111 and the interface 116 can be provided by digital signal processing devices. In such case, a digital/analog converter 117 (DAC) must be connected downstream at the output 113 of the summation device 111. Such converter converts the digital signal 114 into a corresponding analog signal 114a supplying the phase modulator 6. By otherwise entirely digital signal preparation, the output signal 103 (or 103a) is also in digital form.

FIG. 6 shows signal progressions in the presence of rotation rate to supplement the signal progression waveforms of FIG. 2 and specifically for the closed loop arrangement of the invention in the case of incomplete Sagnac phase compensation. FIG. 6A illustrates the rectangular modulation signal corresponding to FIG. 2a for the case of a phase variation of $\pi/2$ peak-peak effective in the phase modulator 6.

In a manner corresponding to FIG. 2d, FIG. 6B shows the light intensity or the electrical drive signal required for the light source 1.

In a manner similar to FIG. 2e, FIG. 6C shows the electrical output signal 9 delivered by the photodetector 7 that corresponds to the incident light intensity. Such signal is shifted in relation to the signal of FIG. 6B by the light transit time $\tau$ and, as determined by the rotation rate, fluctuates cyclically in amplitude according to FIG. 2h. The signal indicated by 9* reproduces the signal 9 as averaged in the low pass filter 11.

The signal of FIG. 6D corresponds to the reference signal of FIG. 2h for the synchronous demodulator 13 or for changing the switching phase for energization and deenergization of the light source 1.

FIG. 6E illustrates the demodulator output signal 18 that is filtered in the low pass filter 14 and exhibits a mean value that corresponds to rotation rate and differs from zero.

Figure 5:
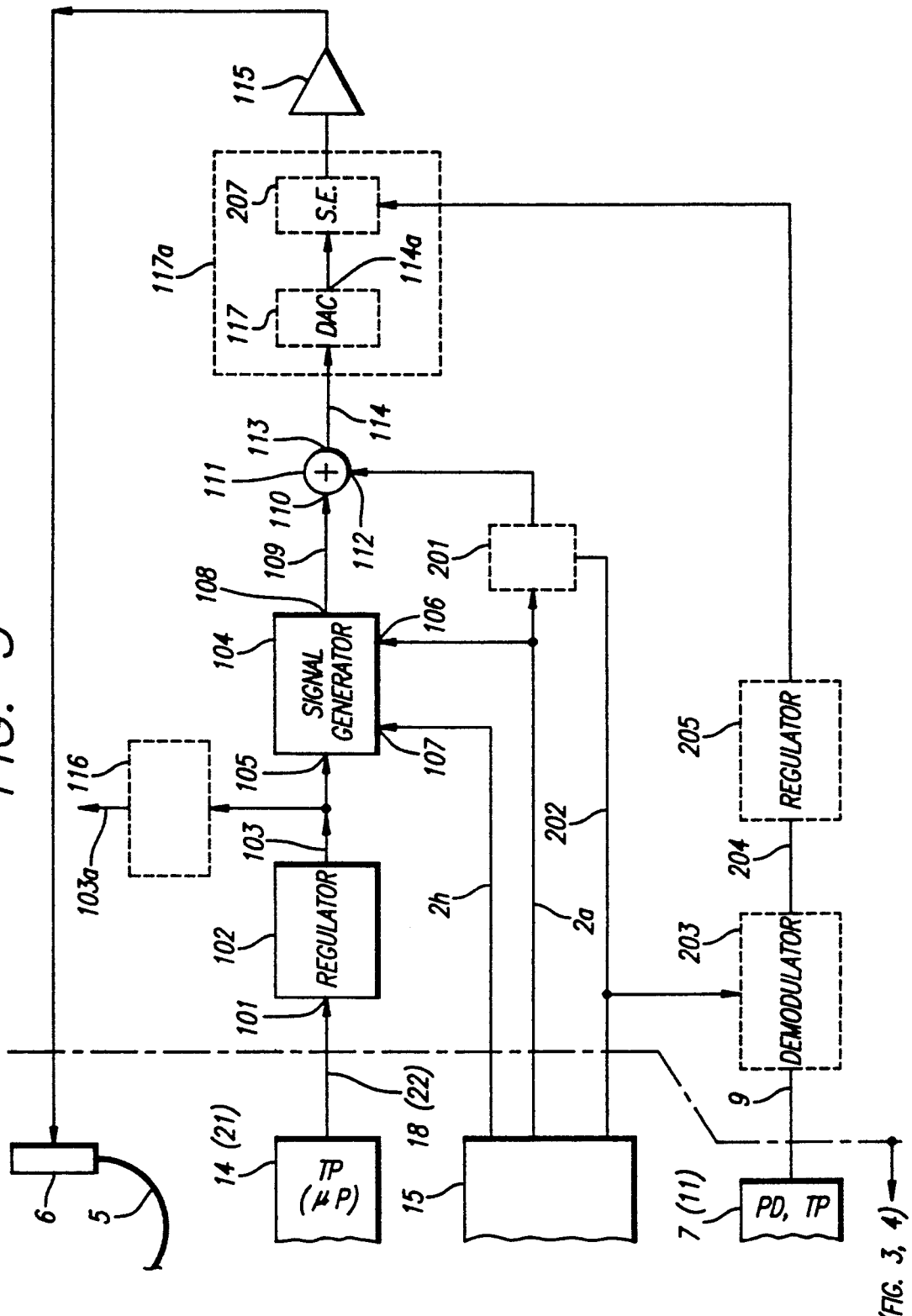
FIG. 5 is a block diagram of a fiber optic Sagnac interferometer that incorporates a demodulator in accordance with FIG. 3 or FIG. 4.

The block diagram of FIG. 5 shows both alternative and supplementary embodiments of the switching arrangement of the invention in broken lines.

In a first modified embodiment, the rectangular modulation signal according to FIG. 2a or 6A is switched by a switching device 201 controlled by a switchover signal 202 whose frequency of alternation may correspond to that of the reference signal for the synchronous demodulator 13. Such signal is, for example, taken from the logic circuit 15 periodically or non-periodically by a factor of 3 in amplitude, so that the effective optical modulation phase shift in the phase modulator 6, normally of amplitude $\pm\pi/4$, is at times increased to $\pm 3\pi/4$.

FIG. 7 illustrates, for this case, the signal progressions in the presence of a rotation rate.

FIG. 7A illustrates the signal 109 at the output of the signal generator 104 with amplitude corresponding to the Sagnac phase $\phi_S$ due to the rotation rate.

FIG. 7B shows the signal 114 downstream of the summation device 111 which is formed as the sum of the signals of FIG. 2a (or FIG. 6A) and 109 and is present at the phase modulator 6.

FIG. 7C illustrates the photodetector signal 9 and the filtered signal, designated by 9*, which represents the mean value when the signal 109 brings precisely about compensation of the Sagnac phase $\Phi_S$. The demodulation of the signal 9* with the reference signal of FIG. 2h in the synchronous demodulator 13 then gives a zero value for the signal 18. That is, the control loop is at steady-state and the amplitude of 109 provides a direct measure of rotation rate.

When the normal modulation value of the amplitude of the signal of FIG. 6A does not amount to precisely $\pm\pi/4$ (due, for example, to amplification errors in the signal generator 104) in the summation device 111 or the amplifier 115 or the phase modulator 6, the intensity value 9 (FIG. 7C) at the photodetector 7 will fluctuate in the cycle of the switch-over signal 202.

To achieve compensation in this case, it is possible to obtain a signal 204 via a synchronous demodulation device 203 (cf. FIG. 5) that demodulates the photodetector signal 9 with the switch-over signal 202 as reference. The signal 204 is substantially proportional to the scale factor error (i.e., to the modulation variation deviation from the nominal value $\pm\pi/4$). This signal 204 is fed to a controller 205, designed in accordance with known principles of control technology and constructed, for example, as a so-called I or PI (integral or proportional-integral) controller that generates at its output a control signal 206 and controls the amplitude of the signal 114 or, in the case of a digital circuit, controls the signal 114 downstream of the DAC 117 via a setting element 207 in such a manner that the effective modulation amplitude amounts to precisely $\pm\pi/4$ or $\pm 3\pi/4$, depending upon the condition of the signal 202, and thus causes the intensity fluctuations in the photodetector signal 9 to vanish, so that the output signal 20 of the demodulator 203 becomes substantially zero.

As shown in FIG. 5 in broken-line block outline, the function of the setting device 207 can be performed together with the function of the DAC 117 in a so-called multiplying digital/analog converter 117a, the reference input of which is acted upon by the control signal from the regulator 205. The output of the multiplying DAC 117 is substantially proportional to the product of the signals 114 and 206. Entirely digital arrangements are possible in which the amplitude control function, which essentially corresponds to the product of the control signal 206 and the phase modulation signal 114, is provided by digital signal processing devices.

Figure 8:
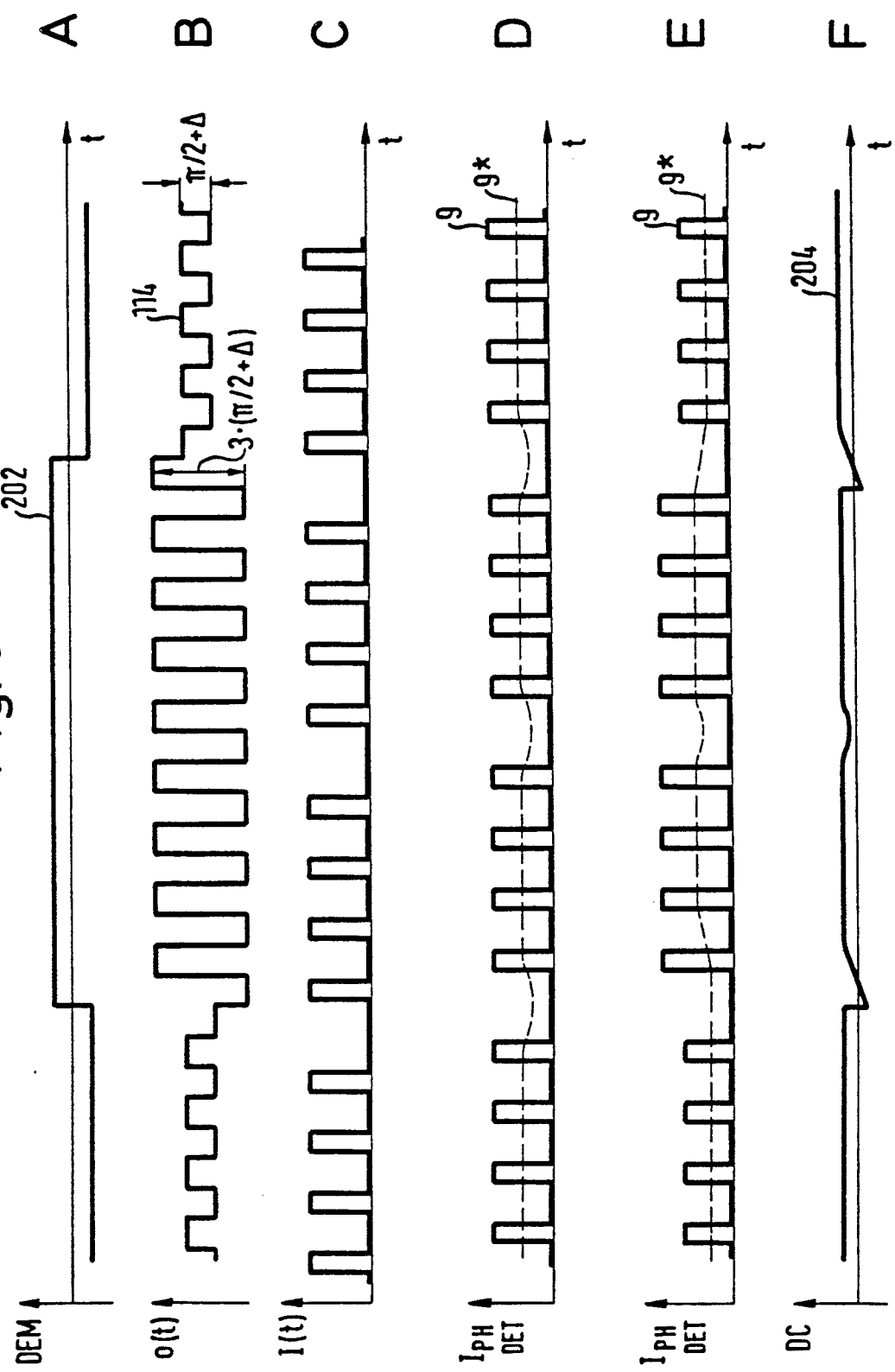
FIGS. 8A through 8F are a series of waveforms for illustrating the operation of the alternative embodiment of FIG. 5 further incorporating scale factor regulation.

FIG. 8 illustrates the signal progressions in the case of a scale factor regulation, as described with reference to the supplements of FIG. 5. For the sake of simplicity, no rotation rate is assumed.

FIG. 8A illustrates the switchover signal 202 in the cycle of which the signal 114 (FIG. 8B) is switched over in amplitude by a factor of 3.

FIG. 8C illustrates the progression of the light intensity of the keyed light source 1.

In the case where the effective phase variation due to the signal 114 (FIG. 8B) amounts to precisely $\pm \pi/4$ or $\pm 3\pi/4$ (i.e., in the case of the correct scale factor ($\Delta=0$), the photodetector 7 delivers the signal 9 (or 9\*) after filtering according to FIG. 8D. Demodulation of the signal 9\* in the demodulator 203 with the reference signal 202 provides the zero value signal 204 (FIG. 8F). That is, the controller 205 will not change the amplitude of the signal 114.

When the amplitude of the signal 14 differs from the nominal value (i.e., the signal 114 is $\pm(\pi/4+\Delta)$ or $\pm 3*(\pi/4+\Delta)$, cf. FIG. 8B), the signals 9 and 9\* demonstrate the progression of FIG. 8E. Demodulation of the signal 9\* with the reference signal 202 in the demodulator 203 yields the signal 204 (FIG. 8F) of non-zero value, which then brings about a correction of the amplitude of the signal 114 via the regulator 205 in such a manner that the error value $\Delta$ of the signal 114 finally becomes zero and the signals 9 and 9\* adopt the progression according to FIG. 8D.

The phase shift progressions of FIGS. 6A, 7A, 7B and 8B are intentionally shown without a zero reference line as the mean value (DC component) of the phase shifts can be arbitrarily selected (at zero as well, of course) without influencing the respective functions.

The following advantages are obtained for Sagnac interferometers of the above-mentioned type by applying the teachings of the invention.

The so-called ramp reset processes described in U.S. Pat. No. 4,705,399 and European patent application 90/100,103.2 require a phase modulator phase variation modulation range of 2 $\pi$ or 3.5 $\pi$, for even low rates of rotation (ie., low Sagnac phase shifts, where "low" rates of rotation refer to those substantially smaller than 2 $\pi$). In the invention, it is only necessary to have a modulation range of 0.5 $\pi$ or 1.5 $\pi$ (the latter in the case of scale factor regulation) plus the additional phase shift caused by the rate of rotation.

This advantage becomes especially effective for low accuracy gyros which, for reasons of cost and space, have small dimensions and short fiber lengths and therefore require only small reset phase variations at even the highest rotation rates. As a result of the reduced modulation, non-stringent requirements are imposed on linearity, voltage supply and voltage rise rate of the supply device for the phase modulator as well as on the linear modulation range of the phase modulator 6 itself.

The expenditure on circuitry is reduced as devices for generation of ramp signals are dispensed with.

Compared with the embodiment, as described in European patent application 89/110,041.4, of a rate of rotation sensor in open loop configuration, the invention achieves the following advantages:

(i) linear interrelationship between the rate of rotation and the output signal;

(ii) high processible dynamic range of rate of rotation;
(iii) small modulation range at the photodetector 6 and subsequent signal processing devices;
(iv) substantially reduced sensitivity to parameter fluctuations (amplifications, light intensity, etc.);
(v) possibility of implementing simple self-test procedures as rotational movements can be simulated by electrically-stimulated phase shifts and then evaluated.

While this invention has been described with reference to its presently-preferred embodiment, it is not limited thereto. Rather, this invention is limited only insofar as it is defined in the following patent claims and includes all equivalents thereof within its scope.

What is claimed is:

1. In a fiber optic Sagnac interferometer for measuring rotation rate of the type in which a light beam emanating from a light source is conducted via a fiber section to pass through a first directional coupler, an output of which is connected to a photodetector for generating a readout signal, and is split in a second directional coupler into two partial light beams which are irradiated in opposite directions into a fiber coil and periodically modulated by a phase modulator which is controlled by a phase modulation signal whose period corresponds to even-numbered multiples of the transit time ($\tau$) of the light through the fiber coil, and in which a switching signal generator periodically scans an exciter signal of the light source so that, during a first time interval corresponding to an integral multiple of the period of the phase modulation signal only a specified first phase portion of the periodic interferometer output signal appears for further processing by a demodulation and evaluation circuit and in which a logic circuit triggers the switching signal generator so that, after the first time interval, during a second time interval or during successive further time intervals corresponding in each instance to an integral multiple of the period of the phase modulation signal, only a second or, in succession in each instance, only a further phase portion of the periodic interferometer readout signal occurs so that, after a plurality, corresponding to the number of individual recorded phase portions, of keying sequence changes, a whole period, of the sequence of the recorded phase portions of the readout signal, is recorded and subsequently and in a similar manner and on a progressive basis, further periods, the duration of each corresponding to the number of keying pulses per phase portion, are substantially longer than the period of the phase modulation signal, and in which the readout signals of the phase portions recorded by the keying process are demodulated synchronously with the scanning time intervals, the improvement comprising:

a) the phase modulator being driven by a modulation signal generator;
b) said modulation signal generator comprising (i) a resetting regulating device arranged to receive said demodulated readout signals, a component signal generator acted upon by the output signal of said regulating device and arranged to deliver a rectangular signal synchronized with the frequency of said periodic phase modulation signal having a rectangular phase relationship alternating in the cycle of a trigger signal of the logic circuit by 180°, the amplitude of such rectangular signal following the output signal of said regulating device and (ii) a summation device arranged to accept the output of said component signal generator at a first input and the phase modulation signal at a second input and wherein the amplified sum output by said summation device acts upon said phase modulator as a compensated phase modulation signal compensated in respect of rotation rate.

2. A fiber optic Sagnac interferometer as defined in claim 1, wherein said resetting regulating device includes a proportional-integral regulator, said component signal generator being responsive to an amplitude control variable and said regulator being set so that the amplitude control variable for said component signal generator is a direct measure of rotation rate that can be read out via an interface connected to said regulator.

3. A fiber optic Sagnac interferometer as defined in claim 1 also including a switch arrangement for switching said phase modulation signal acting upon said second input of said summation device, in response to a control signal delivered by said logic circuit, in amplitude form $\pm\pi/4$ to $\pm 3\pi/4$.

4. A fiber optic Sagnac interferometer as defined in claim 3 further including:
a) a scale factor regulating circuit having a synchronous demodulator which is synchronized by said control signal from the logic circuit;
b) the output of said scale factor regulating circuit feeds a further regulating device for compensating deviations of the amplitude from the switchable target values $\pm\pi/4$ and $\pm 3\pi/4$ in the output signal of the summation device.

* * * * *